United States Patent
Takeda et al.

(10) Patent No.: US 11,115,858 B2
(45) Date of Patent: Sep. 7, 2021

(54) USER TERMINAL, RADIO COMMUNICATION SYSTEM, AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 415 days.

(21) Appl. No.: 15/558,514

(22) PCT Filed: Mar. 18, 2016

(86) PCT No.: PCT/JP2016/058868
§ 371 (c)(1),
(2) Date: Sep. 14, 2017

(87) PCT Pub. No.: WO2016/158536
PCT Pub. Date: Oct. 6, 2016

(65) Prior Publication Data
US 2018/0084454 A1   Mar. 22, 2018

(30) Foreign Application Priority Data
Mar. 31, 2015   (JP) .............................. JP2015-072399

(51) Int. Cl.
*H04W 24/04* (2009.01)
*H04W 72/04* (2009.01)
(Continued)

(52) U.S. Cl.
CPC ............ *H04W 28/04* (2013.01); *H04J 11/00* (2013.01); *H04L 1/1812* (2013.01);
(Continued)

(58) Field of Classification Search
None
See application file for complete search history.

(56) References Cited

U.S. PATENT DOCUMENTS

| | | | |
|---|---|---|---|
| 2011/0268059 A1* | 11/2011 | Li | H04J 11/00 370/329 |
| 2012/0039407 A1* | 2/2012 | Tiirola | H04L 5/001 375/260 |

(Continued)

FOREIGN PATENT DOCUMENTS

CN    102823180 A    12/2012

OTHER PUBLICATIONS

Office Action issued in the counterpart Japanese Patent Application No. 2017-509810, dated Mar. 13, 2018 (5 pages).
(Continued)

*Primary Examiner* — Duc T Duong
(74) *Attorney, Agent, or Firm* — Osha Bergman Watanabe & Burton LLP

(57) ABSTRACT

HARQ-ACK is appropriately transmitted during enhanced carrier aggregation. A user terminal that can communicate with a radio base station by using six or more component carriers includes: a receiving section that receives scheduling information transmitted from the radio base station; a control section that determines based on the scheduling information to apply spatial bundling of a transmission acknowledgement signal only to a component carrier that the spatial bundling is applicable to; and a transmission section that transmits the transmission acknowledgement signal by using a PUCCH format 3.

15 Claims, 11 Drawing Sheets

(51) Int. Cl.
*H04W 28/04* (2009.01)
*H04J 11/00* (2006.01)
*H04L 1/18* (2006.01)
*H04L 5/00* (2006.01)

(52) U.S. Cl.
CPC ............ *H04L 1/1864* (2013.01); *H04L 5/001* (2013.01); *H04W 72/04* (2013.01); *H04W 72/042* (2013.01); *H04W 72/044* (2013.01)

(56) References Cited

U.S. PATENT DOCUMENTS

| | | | |
|---|---|---|---|
| 2012/0082145 A1 | 4/2012 | Chen et al. | |
| 2012/0087254 A1* | 4/2012 | Yin | H04L 1/0031 370/252 |
| 2012/0099491 A1* | 4/2012 | Lee | H04L 5/0053 370/280 |
| 2012/0207123 A1* | 8/2012 | Seo | H04L 1/1861 370/329 |
| 2013/0176920 A1* | 7/2013 | Seo | H04L 1/1861 370/280 |
| 2013/0223295 A1* | 8/2013 | Choi | H04L 1/1614 370/280 |
| 2013/0258914 A1* | 10/2013 | Seo | H04L 1/1896 370/280 |
| 2013/0279480 A1* | 10/2013 | Park | H04L 1/1861 370/335 |
| 2013/0301503 A1* | 11/2013 | Park | H04W 72/0406 370/311 |
| 2013/0329688 A1* | 12/2013 | Yang | H04L 1/1861 370/329 |
| 2014/0056187 A1 | 2/2014 | Papasakellariou et al. | |
| 2014/0105076 A1* | 4/2014 | Yang | H04W 72/0413 370/280 |
| 2015/0173024 A1* | 6/2015 | Seo | H04W 52/146 370/329 |
| 2015/0237619 A1* | 8/2015 | Yang | H04L 5/14 370/280 |
| 2015/0319753 A1* | 11/2015 | Chen | H04L 5/001 370/277 |
| 2016/0007324 A1* | 1/2016 | Lee | H04L 5/0055 370/329 |
| 2016/0226644 A1* | 8/2016 | Gaal | H04W 72/0413 |
| 2016/0301510 A1* | 10/2016 | Seo | H04L 27/361 |
| 2017/0318575 A1* | 11/2017 | Park | H04W 72/0413 |
| 2017/0366305 A1* | 12/2017 | Hwang | H04L 1/1812 |
| 2017/0366323 A1* | 12/2017 | Ahn | H04L 5/00 |
| 2017/0366380 A1* | 12/2017 | Hwang | H04L 1/1671 |
| 2018/0034526 A1* | 2/2018 | Lee | H04W 24/10 |
| 2019/0268123 A1* | 8/2019 | Ahn | H04L 5/0055 |
| 2019/0268899 A1* | 8/2019 | Seo | H04L 1/1671 |

OTHER PUBLICATIONS

Intel Corporation; "Discussion on CA enhancement for release 13"; 3GPP TSG-RAN WG1 #80 R1-150086; Athens, Greece, Feb. 9-13, 2015 (6 pages).
LG Electronics; "HARQ-ACK transmission for supporting CA of up to 32 carriers"; 3GPP TSG RAN WG1 Meeting #80 R1-150209; Athens, Greece, Feb. 9-13, 2015 (6 pages).
International Search Report of the International Searching Authority issued in PCT/JP2016/058868 dated Jun. 7, 2016 (2 pages).
Written Opinion of the International Searching Authority issued in PCT/JP2016/058868 dated Jun. 7, 2016 (5 pages).
3GPP TSG RAN WG1 #80; R1-150749; Samsung; "HARQ-ACK Transmission for Enhanced CA"; Athens, Greece; Feb. 9-13, 2015 (4 pages).
3GPP TSG RAN WG1 Meeting #80; R1-150207; LG Electronics; "Necessary mechanisms and enhancements to support CA of up to 32 carriers"; Athens, Greece; Feb. 9-13, 2015 (4 pages).
3GPP TSG RAN WG1 Meeting #80; R1-150410; Huawei, HiSilicon; "Enhancements to ACK/NAK on PUCCH for up to 32 component carriers"; Athens, Greece; Feb. 9-13, 2015 (3 pages).
3GPP TSG RAN WG1 Meeting #80; R1-150742; InterDigital; "PUSCH coverage enhancement for MTC UE"; Athens, Greece; Feb. 9-13, 2015 (3 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in corresponding European Application No. 16772418.6, dated Oct. 22, 2018 (11 pages).
Office Action issued in the counterpart Chinese Patent Application No. 201680019323.2, dated Jul. 27, 2020 (13 pages).
Office Action issued in European Application No. 16772418.6; dated Jan. 19, 2021 (8 pages).
Office Action issued in the counterpart Chinese Patent Application No. 201680019323.2, dated Mar. 25, 2021 (13 pages).

\* cited by examiner

| | CC#1 | CC#2 | CC#3 | CC#4 | CC#5 |
|---|---|---|---|---|---|
| CW1 | 1 | 1 | 1 | 1 | 1 |
| CW2 | 1 | 1 | 1 | 1 | 1 |

FIG. 1A

| | CC#1 | | CC#2 | | CC#3 | | CC#4 | | CC#5 | |
|---|---|---|---|---|---|---|---|---|---|---|
| CW1 | 1 | 1 | 1 | 1 | | 1 | 1 | | 1 | 1 |
| CW2 | 1 | 1 | 1 | 1 | | 1 | 1 | | 1 | 1 |

FIG. 1B

| | CC#1 | | | | CC#2 | | | | CC#3 | | | | CC#4 | | | | CC#5 | | | |
|---|---|---|---|---|---|---|---|---|---|---|---|---|---|---|---|---|---|---|---|---|
| CW1 | 1 | 1 | 1 | 1 | 1 | 1 | 1 | 1 | 1 | 1 | 1 | 1 | 1 | 1 | 1 | 1 | 1 | 1 | 1 | 1 |
| CW2 | 1 | 1 | 1 | 1 | 1 | 1 | 1 | 1 | 1 | 1 | 1 | 1 | 1 | 1 | 1 | 1 | 1 | 1 | 1 | 1 |

FIG. 1C

|     | CC#1 | CC#2 | CC#3 | CC#4 | CC#5 | CC#6 | CC#7 | CC#8 | CC#9 | CC#10 |
|-----|------|------|------|------|------|------|------|------|------|-------|
| CW1 | 1    | 1    | 1    | 1    | 1    | 1    | 1    | 1    | 1    | 1     |
| CW2 |      |      |      |      |      |      |      |      |      |       |

|  | CC#1 | CC#2 | CC#3 | CC#4 | CC#5 | CC#6 |
|---|---|---|---|---|---|---|
| CW1 | 1 | 1 | 1 | 1 | 1 | 1 |
| CW2 | 1 | 1 | 1 | 1 |  |  |

FIG. 4B

|  | CC#1 | CC#2 | CC#3 | CC#4 | CC#5 | CC#6 | CC#7 |
|---|---|---|---|---|---|---|---|
| CW1 | 1 | 1 | 1 | 1 | 1 | 1 | 1 |
| CW2 | 1 | 1 | 1 |  |  |  |  |

FIG. 5A

|  | CC#1 | CC#2 | CC#3 | CC#4 | CC#5 | CC#6 |
|---|---|---|---|---|---|---|
| CW1 | 1 | 1 | 1 | 1 | 1 | 1 |
| CW2 | 1 | 1 | 1 | 1 | | |

FIG. 5B

|  | CC#1 | CC#2 | CC#3 | CC#4 | CC#5 | CC#6 |
|---|---|---|---|---|---|---|
| CW1 | 1 | | 1 | 1 | 1 | |
| CW2 | 1 | | 1 | 1 | 1 | |

| | CC#1 | CC#2 | CC#3 | CC#4 | CC#5 | CC#6 |
|---|---|---|---|---|---|---|
| CW1 | 1 | 1 | 1 | 1 | 1 | |
| CW2 | 1 | 1 | 1 | 1 | 1 | |

FIG. 6A

| | CC#1 | CC#2 | CC#3 | CC#4 | CC#5 | CC#6 |
|---|---|---|---|---|---|---|
| CW1 | 1 | 1 | 1 | 1 | 1 | |
| CW2 | 1 | 1 | 1 | 1 | 1 | 1 |

FIG. 6B

USER TERMINAL, RADIO COMMUNICATION SYSTEM, AND RADIO COMMUNICATION METHOD

TECHNICAL FIELD

The present invention relates to a user terminal, a radio communication system, and a radio communication method of the next-generation communication system.

BACKGROUND ART

In UMTS (Universal Mobile Telecommunications System) networks, for the purpose of higher data rates, low delay and the like, Long Term Evolution (LTE) has been specified (Non-Patent Document 1). For the purpose of wider bands and a higher speed than LTE, LTE Advanced has been specified, and a successor system of LTE that is called, for example, FRA (Future Radio Access) has been studied.

A system band according to LTE Rel.10/11 includes at least one component carrier (CC) whose one unit is a system band of an LTE system. Aggregating a plurality of component carriers and widening a band in this way are referred to as carrier aggregation (CA).

According to LTE Rel.12 that is another successor system of LTE, various scenarios for using a plurality of cells in different frequency bands (carriers) have been studied. When radio base stations that form a plurality of cells are substantially identical, the above-described carrier aggregation is applicable. When radio base stations that form a plurality of cells are completely different, it is considered to apply dual connectivity (DC).

CITATION LIST

Non-Patent Literature

[Non-Patent Literature 1] 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

According to carrier aggregation according to LTE Rel.10/11/12, the number of component carriers that can be configured per user terminal is limited to five at maximum. According to LTE Rel.13 and subsequent versions, the number of component carriers that can be configured per user terminal is six or more to realize more flexible and higher speed radio communication, and enhanced carrier aggregation for bundling these component carriers has been studied.

According to LTE Rel.10/11/12, PUCCH (Physical Uplink Control Channel) format 1b with channel selection that is applicable to two component carriers at maximum and PUCCH format 3 that is applicable to five component carriers at maximum have been introduced as a HARQ-ACK (Hybrid Automatic Repeat Request Acknowledgement) transmitting method using a PUCCH.

However, according to the enhanced carrier aggregation where the number of component carriers that can be configured per user terminal is six or more, how to transmit HARQ-ACK has not yet been defined.

The present invention has been made in view of such a respect, and it is an object of the invention to provide a user terminal, a radio communication system and a radio communication method for appropriately transmitting HARQ-ACK during enhanced carrier aggregation.

A user terminal according to the present invention is a user terminal that can communicate with a radio base station by using six or more component carriers, and that includes: a receiving section that receives scheduling information transmitted from the radio base station; a control section that determines based on the scheduling information to apply spatial bundling of a transmission acknowledgement signal only to a component carrier that the spatial bundling is applicable to; and a transmission section that transmits the transmission acknowledgement signal by using a PUCCH format 3.

According to the present invention, it is possible to appropriately transmit HARQ-ACK during enhanced carrier aggregation.

BRIEF DESCRIPTION OF DRAWINGS

FIG. 1 contain diagrams for explaining a PUCCH format 3 in a case of existing carrier aggregation;

FIG. 3 is a diagram for explaining spatial bundling in a case of FDD;

FIG. 4 contain diagrams for explaining spatial bundling according to Aspect 1;

FIG. 5 contain diagrams for explaining spatial bundling according to Aspect 2;

FIG. 6 contain diagrams for explaining variation examples of the spatial bundling;

DESCRIPTION OF EMBODIMENTS

An Embodiment of the present invention will be described in detail below with reference to the drawings.

According to LTE Rel.13, enhanced carrier aggregation that removes a limitation on the number of component carriers that can be configured per user terminal is studied. According to the extended aggregation, bundling, for example, 32 component carriers at maximum is studied. The enhanced carrier aggregation realizes more flexible and higher speed radio communication. Further, according to the enhanced carrier aggregation, it is possible to bundle multiple component carriers of a continuous ultrawide band.

According to the enhanced carrier aggregation, a transmission acknowledge signal (HARQ-ACK) and control information such as CQI (Channel Quality Indicator) are fed back on an uplink control channel.

Generally, a payload size and a required SINR (Signal to Interference plus Noise Ratio) that can be transmitted on a PUCCH have a tradeoff relationship. That is, increasing a payload to enable transmission of HARQ-ACKs of multiple component carriers increases a required SINR, and therefore reduces a carrier aggregation application range. Keeping a low required SINR makes it necessary to reduce a payload, and therefore makes it impossible to transmit the HARQ-ACKs of the multiple component carriers.

The PUCCH format 3 introduced to the carrier aggregation according to LTE Rel.10/11/12 is effective for five component carriers or less. This PUCCH format 3 is assumed to be used by a user terminal, too, that supports the enhanced carrier aggregation according to Rel.13.

According to the existing PUCCH format 3, it is possible to multiplex HARQ-ACKs of five component carriers at maximum. In the case of Frequency Division Duplex (FDD), it is possible to multiplex HARQ-ACKs of the five component carriers every two codewords (CW) at maximum and, consequently, transmit 10-bit (5CC×2CW) HARQ-ACKs (see FIG. 1A).

In the case of Time Division Duplex (TDD), it is possible to multiplex HARQ-ACKs of four subframes (SF) every five component carriers at maximum and, consequently, transmit 20-bit (5CC×4SF) HARQ-ACKs (see FIGS. 1B and 1C). The number of HARQ bits in a subframe direction is counted based on the number of times of scheduling. A radio base station notifies the user terminal of the number of HARQ bits indicated by a downlink assignment index (DAI) included in a PDCCH (Physical Downlink Control Channel). When the number of HARQ bits exceeds 20 bits in total, the user terminal applies spatial bundling to all component carriers and all subframes.

Figure 2:
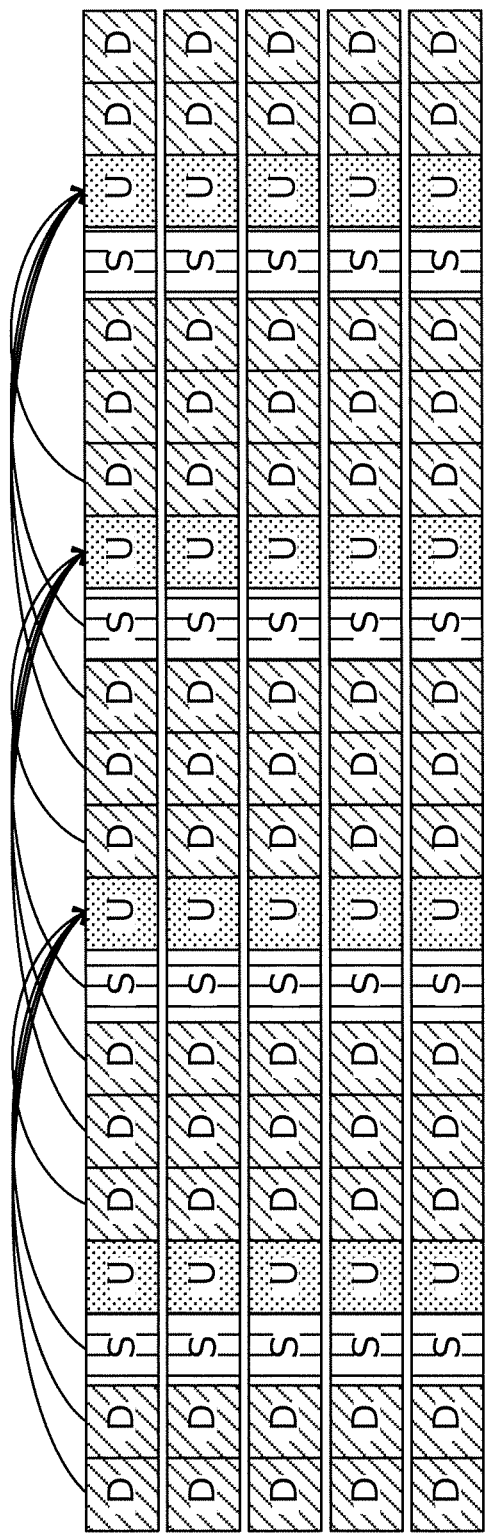
FIG. 2 is a diagram for explaining the PUCCH format 3 in the case of the existing carrier aggregation.

Tables illustrated in FIGS. 1B and 1C assume TDD carrier aggregation for bundling five component carriers of a UL-DL configuration #2 as illustrated in FIG. 2. In this case, it is possible to transmit 40-bit (5CC×2CW×4SF) HARQ bits at maximum. However, even when the number of HARQ bits notified by a DAI is 40 bits or less, the user terminal determines whether or not the number of HARQ bits exceeds 20 bits during PUCCH transmission, and determines whether or not spatial bundling is applicable. In an example illustrated in FIG. 1B, the number of HARQ bits is 18 bits in total, and therefore the user terminal does not apply the spatial bundling. In an example illustrated in FIG. 1C, the number of HARQ bits exceeds 20 bits, and therefore the user terminal bundles the HARQ bits in a space (codeword) direction in all downlink subframes of all component carriers, and compresses the HARQ bits to 20 bits or less.

According to the enhanced carrier aggregation, when, for example, a new PUCCH format that can support 32 component carriers at maximum is introduced, the new PUCCH format is assumed to employ a configuration different from that of the existing PUCCH.

It is highly probable that this new PUCCH format cannot be multiplexed on the same physical resource blocks (PRB) as those of the existing PUCCH.

When physical resource blocks that differ between the user terminal that supports the existing carrier aggregation and the user terminal that supports the enhanced carrier aggregation are used for PUCCH transmission, an overhead on uplink becomes high. Thus, resources that can be used for a PUSCH (Physical Uplink Shared Channel) decrease.

Hence, inventors of the present invention have found a configuration that supports 10 component carriers at maximum by using the existing PUCCH format 3 in the case of the enhanced carrier aggregation.

In the case of FDD, the space handing is not yet introduced, so that it is possible to compress HARQ bits by introducing the spatial bundling similar to TDD. By introducing the spatial bundling similar to TDD, it is possible to increase the maximum number of component carriers of the PUCCH format 3 to 10 while maintaining the maximum number of HARQ bits at 10 bits (see FIG. 3).

However, when the spatial bundling is applied as illustrated in FIG. 3, it is not possible to perform fine HARQ control per codeword. Further, when a negative response (NACK: Negative Acknowledgement) is transmitted by using one of two codewords, both of the codewords are retransmitted. Hence, there is a concern that a downlink throughput per component carrier deteriorates.

(Aspect 1)

Hence, in Aspect 1, a user terminal applies spatial bundling only to selected component carriers. The component carriers that the spatial bundling is applied to may be selected according to a predetermined rule or may be configured in advance by higher layer signaling.

According to the predetermined rule, the spatial bundling may be applied to component carriers of relatively high cell indices or secondary cell (Scell) indices. According to an example of the predetermined rule, taking into account that the existing carrier aggregation supports the five component carriers at maximum, the spatial bundling is applied to CC#6 and subsequent CCs at all times, and the spatial bundling may be performed such that the total number of HARQ bits is 10 bits in order of a higher cell index (CC#) according to the number of component carriers to be configured. When, for example, CC#6 and CC#7 are configured, the spatial bundling is applied to CC#6 and CC#7, and the spatial bundling is applied to CC#5 and CC#4, too, to configure the total number of HARQ bits to 10 bits. By so doing, the component carriers that the spatial bundling is applied to is uniquely determined based on the configured number of component carriers, and it is possible to reduce a signaling overhead.

RRC (Radio Resource Control) signaling can be used for the higher layer signaling. By enabling an instruction to apply the spatial bundling to random component carriers by RRC signaling, it is possible to flexibly control HARQ control between component carriers by, for example, applying the spatial bundling to CC#3 and CC#4 without applying the spatial bundling to a lastly added component carrier.

In an example illustrated in FIG. 4A, the user terminal transmits HARQ bits of six component carriers by applying the spatial bundling only to CC#5 and CC#6 that are the selected component carriers. In an example illustrated in FIG. 4B, the user terminal transmits HARQ bits of seven component carriers by applying the spatial bundling to CC#4 to CC#7.

By applying the spatial bundling only to specific component carriers among component carriers subjected to carrier aggregation, it is possible to reduce HARQ bits to be transmitted without an influence of the spatial bundling on a downlink throughput of a predetermined component carrier such as a primary cell (PCell). Consequently, it is possible to increase the number of component carriers that HARQ bits are multiplexed on while a total payload to be multiplexed on a PUCCH keeps a predetermined value (10 bits herein).

The PUCCH format 3 that is used for the existing carrier aggregation, too, makes it possible to support 10 component carriers at maximum, so that it is possible to multiplex a PUCCH of the user terminal that supports the existing carrier aggregation and a PUCCH of the user terminal that supports the enhanced carrier aggregation on the same PRB. Consequently, it is possible to reduce an uplink overhead.

In this regard, the user terminal that does not detect downlink allocation to component carriers that the spatial bundling is applied to transmit a NACK response for the HARQ bits of the PUCCH. That is, irrespective of whether or not the allocation is detected, a total payload is identical at all times, HARQ bits corresponding to component carriers or codewords are fed back for component carriers that the spatial bundling is not applied to, and one-bit HARQ bit is fed back for component carriers that the spatial bundling is applied to.

(Aspect 2)

In Aspect 2, when spatial bundling is applied only to selected component carriers, whether or not the spatial bundling is applicable may be determined according to whether or not the number of HARQ bits notified by a DAI included in a PDCCH exceeds 10 bits. This configuration is the same as a configuration where, in the case of TDD, whether or not the spatial bundling is applicable is determined according to whether or not the number of HARQ bits exceeds 20 bits. In this regard, unlike existing spatial bundling according to TDD, in this case, component carriers that the spatial bundling is applied to are only specific component carriers, and the spatial bundling is not applied to other component carriers.

In an example FIG. 5A, six component carriers are configured to a user terminal. The user terminal receives a PDCCH or an EPDCCH for scheduling downlink in each subframe, and checks DAI bits included in the PDCCH or the EPDCCH. When the DAI indicates allocation of 10 or more PDSCHs, the number of HARQ bits whose transmission is requested exceeds 10 bits, and therefore the user terminal applies the spatial bundling to CC#5 and CC#6. In an example illustrated in FIG. 5B, the number of HARQ bits notified by the DAI does not exceed 10 bits, and therefore the user terminal does not apply the spatial bundling. Thus, the user terminal may determine whether or not the spatial bundling is applicable according to the number of scheduled codewords or TBs (Transport Block).

(Variation 1)

For component carriers (CC#1 and CC#4 in FIG. 6A) other than component carriers that the spatial bundling is applicable to, a user terminal determines semi-statically determines the number of HARQ bits based on the number of component carriers and a transmission mode (TM) configured in an higher layer. Then, for component carriers (CC#5 and CC#6 in FIG. 6A) that the spatial bundling is applicable to, the user terminal may dynamically determine whether or not the spatial bundling is applicable, based on the number of allocated PDSCHs (Physical Downlink Shared Channel), i.e., based on scheduling information.

In this case, as for component carriers other than component carriers that the spatial bundling is applicable to, the user terminal transmits negative responses (NACK) for component carriers and codewords that are configured in the higher layer yet PDSCHs are not allocated to.

In an example illustrated in FIG. 6A, when a PDSCH is allocated to one of CC#5 and CC#6, the number of HARQ bits does not exceed 10 bits, and therefore the user terminal does not apply the spatial bundling. Although PDSCHs are allocated to both of CC#5 and CC#6, when only CW1 or only CW2 are scheduled for both of CC#5 and CC#6, the number of HARQ bits does not exceed 10 bits, and therefore the user terminal does not apply the spatial bundling. When PDSCHs are allocated to both of CC#5 and CC#6, and when both of CW1 and CW2 are scheduled for at least 1CC, the number of HARQ bits exceeds 10 bits, and therefore the user terminal applies the spatial bundling.

By so doing, when a traffic is congested, i.e., only when two codewords are concurrently allocated, the spatial bundling is applied. When two codewords are not concurrently allocated, it is possible to demultiplex HARQ bits and perform fine control for component carriers to be additionally used. As a result, it is possible to make a throughput improvement effect resulting from an increase in the number of component carriers, and flexible HARQ control compatible.

(Variation 2)

A user terminal may dynamically determine whether or not spatial bundling is applicable to specific component carriers based on component carriers that include component carriers, too, other than component carriers (CC#5 and CC#6 in FIG. 6B) that the spatial bundling is applicable to, and are configured in an higher layer, and the number of allocated PDSCHs of an entire transmission mode, i.e., based on scheduling information.

The user terminal determines whether or not spatial bundling is applicable, according to the scheduling information indicating how many PDSCHs are allocated to all component carriers (CC#1 and CC#6 in FIG. 6B). In this case, component carriers and a codeword (CW2) that are configured yet the PDSCHs are allocated to are not included in HARQ bits. In an example illustrated in FIG. 6B, the number of HARQ bits for all component carriers does not exceed 10 bits, and therefore the user terminal does not apply the spatial bundling. When the number of HARQ bits for all component carriers exceeds 10 bits, the user terminal applies the spatial bundling to component carriers (e.g. CC#5 and CC#6) that the spatial bundling is applicable to.

There is a concern that component carriers for which the number of HARQ bits and whether or not the spatial bundling is applicable are dynamically determined based on the scheduling information are negatively influenced by a detection mistake of the scheduling information in the user terminal.

For example, it is assumed in Variation 1 that two codewords are scheduled for both component carriers of CC#5 and CC#6 yet the user terminal makes a detection mistake of scheduling information of CC#6. In this case, the user terminal transmits HARQ bits of CW1 and CW2 of CC#5 without applying the spatial bundling (see FIG. 6A). However, fundamentally, scheduling is performed for both of CC#5 and CC#6, and therefore the user terminal needs to apply the spatial bundling. Further, although scheduling is performed yet PDSCHs are not allocated for CC#6, the user terminal needs to transmit a negative response (NACK).

In the case of Variation 2, HARQ bits of all component carriers can change based on scheduling information, and therefore an influence of a detection mistake of scheduling information in the user terminal is more significant.

Hence, a DAI indicating information indicating for how many component carriers and codewords are scheduled or for how many component carriers or codewords are scheduled may be included in scheduling information (a PDCCH or an EPDCCH).

In the case of Variation 1, as long as information indicating how many CCs/CWs are scheduled for CC#5 and CC#6 is notified by the scheduling information (the PDCCH or the EPDCCH), even when the user terminal can detect only scheduling information of CC#5, the user terminal can recognize a detection mistake of scheduling mistake of CC#6. Consequently, when the user terminal can recognize whether or not scheduling is performed for CC#6, the user terminal can recognize whether or not the spatial bundling is applicable to the HARQ bits of CC#5. Consequently, it is possible to solve a mismatch of recognition of HARQ bits between the user terminal and a radio base station.

In the case of Variation 1, the DAI indicating whether or not allocation is performed may be included only in a PDCCH for scheduling PDSCHs of the component carriers (CC#5 and CC#6 in FIG. 6A) that the spatial bundling is applicable to. Thus, the PDCCH or the EPDCCH that PDSCHs of component carriers that the spatial bundling is not applicable to are allocated to does not include several bits corresponding to the DAI, so that it is possible to reduce an overhead of the PDCCH/EPDCCH.

This DAI may be included in the PDCCH or the EPDCCH for scheduling PDSCHs of all component carriers (CC#1 to CC#6 in FIG. 6A). In this case, it is sufficient to use the DAI to notify the number of allocated CCs/CWs of component carriers except for component carriers for which the number of HARQ bits is semi-statically determined. Thus, it is possible to grasp a value of the DAI based on a random PDCCH and, consequently, realize a recognition match reliably. Further, the DAI is not used to notify the number of CCs/CWs of component carriers for which the number of HARQ bits is semi-statically determined, so that it is possible to reduce a range of a value that can be notified by using the DAI, reduce a total DAI bit length and suppress an overhead.

In the case of Variation 2, HARQ bits are not allocated to CCs/CWs that are not scheduled in CC#1 to CC#4, either, and therefore it is necessary to use the DAI to notify whether or not allocation is performed for these component carriers.

In the case of Variation 2, the DAI indicating whether or not HARQ bits are allocated is preferably included in PDCCHs of all component carriers (CC#1 to CC#6 in FIG. 6B). In this case, it is necessary to use the DAI to notify how many HARQ bits are allocated to all component carriers.

(Configuration of Radio Communication System)

The configuration of the radio communication system according to this Embodiment will be described below. A radio communication method for performing the above spatial bundling is applied to this radio communication system.

Figure 7:
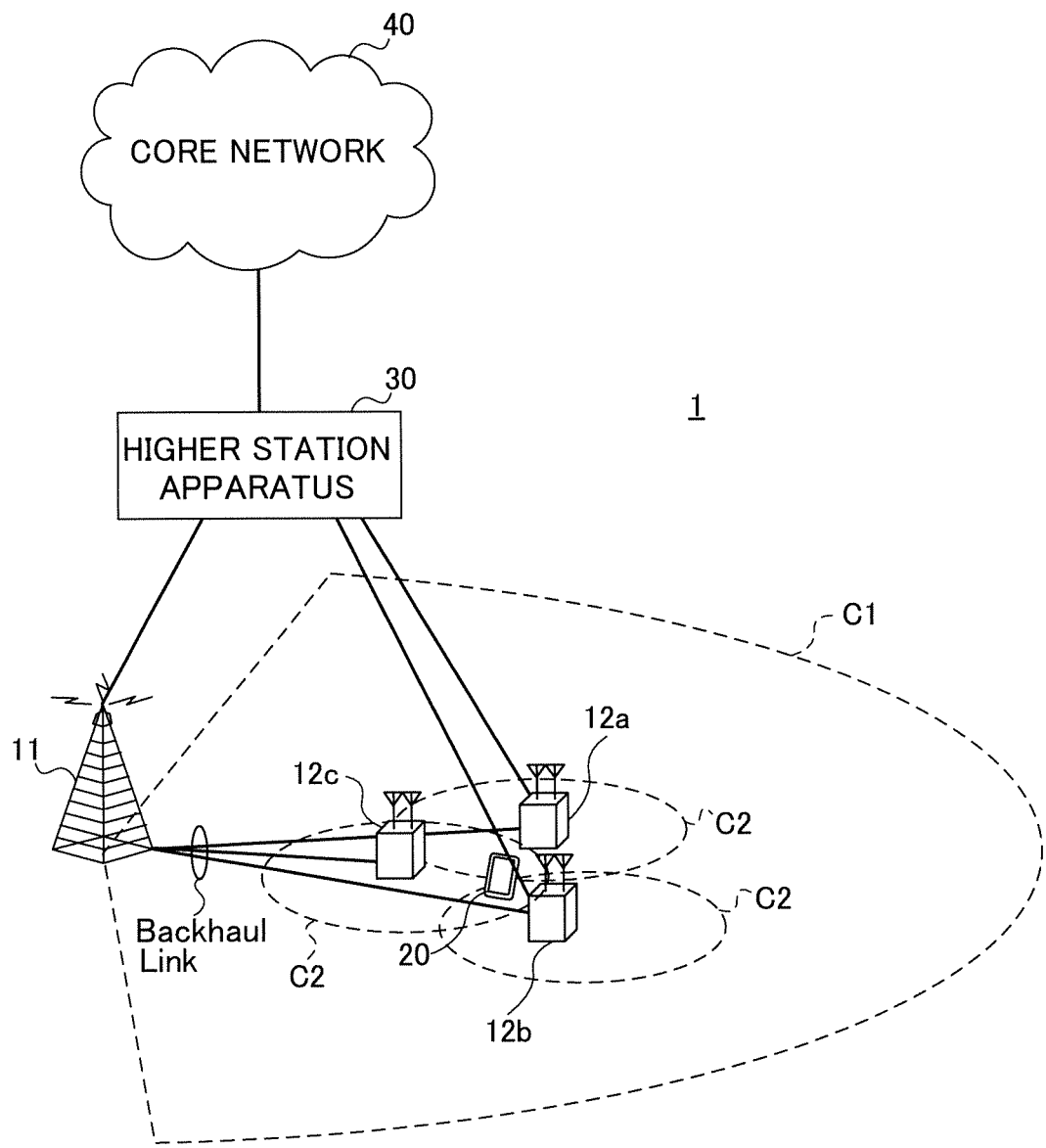
FIG. 7 is a diagram illustrating an example of a schematic configuration of a radio communication system according to this Embodiment.

FIG. 7 is a schematic configuration diagram illustrating an example of the radio communication system according to this Embodiment. In the radio communication system, it is possible to apply one or both of carrier aggregation to aggregate a plurality of base frequency blocks (component carriers) whose one unit is a system bandwidth of the LTE system, and dual connectivity.

As illustrated in FIG. 7, a radio communication system 1 includes a plurality of radio base stations 10 (11 and 12), and a plurality of user terminals 20 that is in a cell formed by each radio base station 10, and is configured to be able to communicate with each radio base station 10. Each radio base station 10 is connected to a higher station apparatus 30, and is connected to a core network 40 via the higher station apparatus 30.

In FIG. 7, the radio base station 11 is composed of a macro base station having relatively wide coverage, and forms a macrocell C1. Each radio base station 12 is composed of a small base station having local coverage, and forms a small cell C2. In this regard, the number of radio base stations 11 and 12 is not limited to the number illustrated in FIG. 7.

For example, according to one aspect, the macrocell C1 is operated in a licensed band and the small cells C2 are operated in unlicensed bands. Alternatively, according to another aspect, part of the small cells C2 may be operated in the licensed band, and the rest of small cells C2 may be operated in the licensed band. The radio base stations 11 and 12 are connected to each other via an inter-base station interface (e.g. optical fibers or an X2 interface).

The user terminal 20 is capable of connecting to both of the radio base station 11 and the radio base stations 12. It is conceived that the user terminal 20 concurrently uses the macrocell C1 and the small cells C2 using different frequencies by carrier aggregation or dual connectivity.

The higher station apparatus 30 includes, for example, an access gateway apparatus, a Radio Network Controller (RNC), a Mobility Management Entity (MME) and the like, but is not limited thereto.

The radio communication system 1 uses a downlink shared channel (PDSCH: Physical Downlink Shared Channel), downlink control channels (PDCCH: Physical Downlink Control Channel and EPDCCH: Enhanced PDCCH), and a broadcast channel (PBCH: Physical Broadcast Channel) shared by each user terminal 20 as downlink channels. User data, higher layer control information and a predetermined SIB (System Information Block) are transmitted on the PDSCH. Downlink control information (DCI) is transmitted on the PDCCH and the EPDCCH.

The radio communication system 1 uses an uplink shared channel (PUSCH: Physical Uplink Shared Channel) and an uplink control channel (PUCCH: Physical Uplink Control Channel) shared by each user terminal 20 as uplink channels. User data and higher layer control information are transmitted on the PUSCH.

Figure 8:
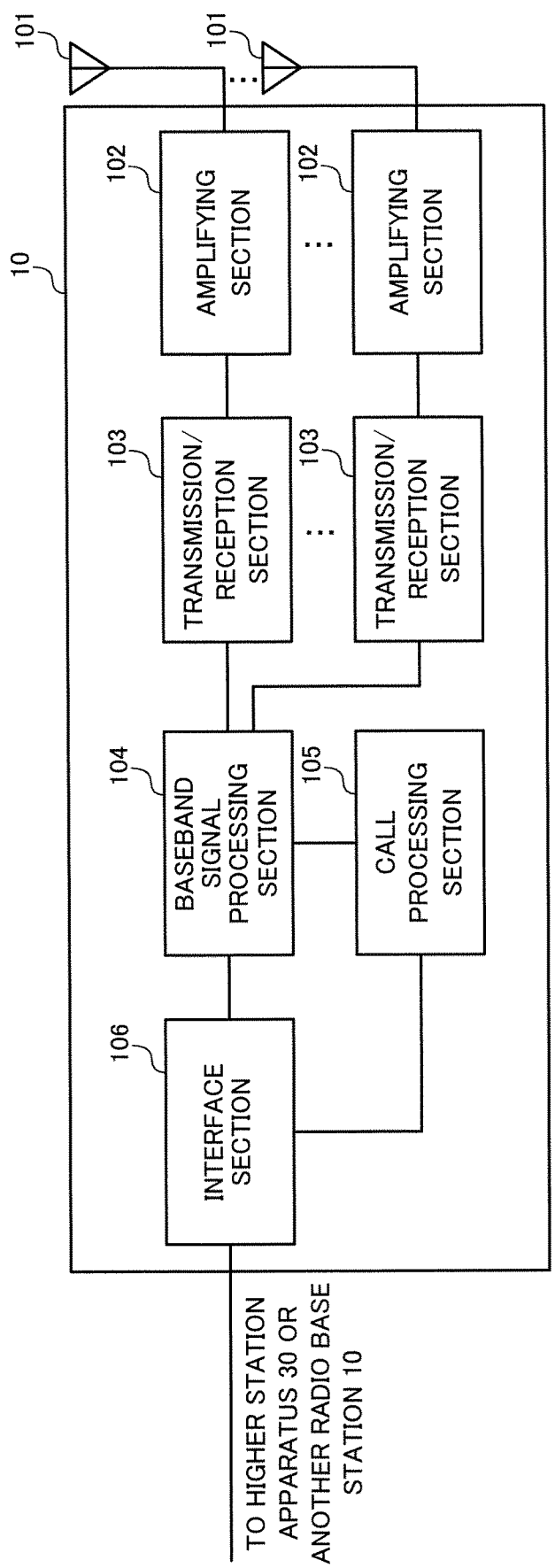
FIG. 8 is a diagram illustrating an example of an entire configuration of a radio base station according to this embodiment.

FIG. 8 is an entire configuration diagram of the radio base station 10 according to this Embodiment. As illustrated n FIG. 8, the radio base station 10 includes a plurality of transmission/reception antennas 101 for MIMO (Multiple-input and Multiple-output) transmission, amplifying sections 102, transmission/reception sections 103, a baseband signal processing section 104, a call processing section 105, and an interface section 106.

User data transmitted from the radio base station 10 to the user terminal 20 on downlink is input from the higher station apparatus 30 to the baseband signal processing section 104 via the interface section 106.

The baseband signal processing section 104 performs processing of a PDCP (Packet Data Convergence Protocol) layer, segmentation and concatenation of the user data, transmission processing of a RLC (Radio Link Control) layer such as transmission processing of RLC retransmission control, and MAC (Medium Access Control) retransmission control such as transmission processing of HARQ (Hybrid Automatic Repeat Request), scheduling, transmission format selection, channel coding, Inverse Fast Fourier Transform (IFFT: Inverse Fast Fourier Transform) processing, and precoding processing on the input user data to transfer to each of the transmission/reception sections 103. Further, the baseband signal processing section 104 performs transmission processing such as channel coding and Inverse Fast Fourier Transform on a signal of the downlink control channel to transfer to each of the transmission/reception sections 103.

Each transmission/reception section 103 converts a downlink signal precoded and output per antenna from each baseband signal processing section 104, into a radio frequency band. Each amplifying section 102 amplifies the radio frequency signal subjected to frequency conversion, and transmits the radio frequency signal from the transmission/reception antennas 101. A transmitter/receiver, a transmission/reception circuit or a transmission/reception device described based on a common knowledge in a technical field of the present invention is applicable to the transmission/reception sections 103.

Each amplifying section 102 amplifies a radio frequency signal as an uplink signal received by each transmission/reception antenna 101, and each transmission/reception section 103 performs frequency conversion on the radio frequency signal into a baseband signal and inputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of a RLC layer and a PDCP layer on user data included in the input baseband signal to transfer to the higher station apparatus 30 via the interface section 106. The call processing section 105 performs call processing such as configuration and release of a communication channel, state management of the radio base station 10, and management of radio resources.

The interface section 106 transmits and receives (backhaul signaling) signals to and from a neighboring radio base station via the inter-base station interface (e.g. the optical fibers and an X2 interface). Alternatively, the interface section 106 transmits and receives signals to and from the higher station apparatus 30 via a predetermined interface.

Figure 9:
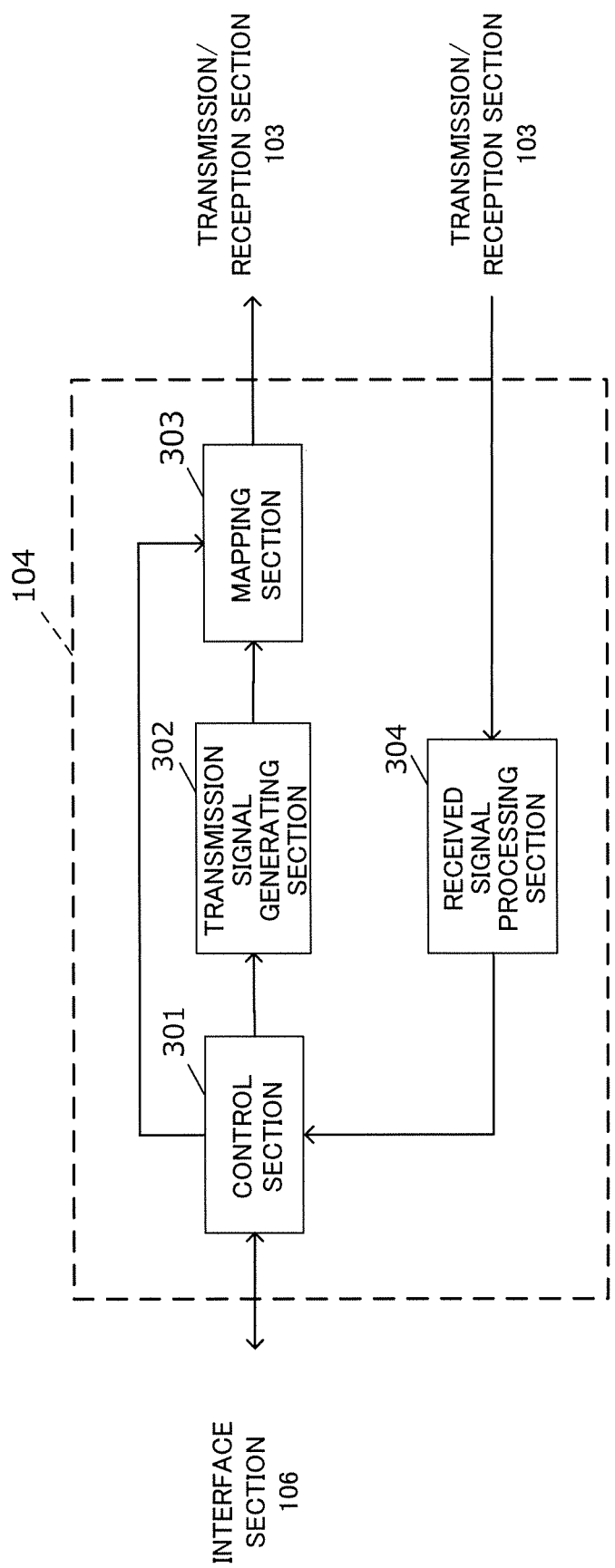
FIG. 9 is a diagram illustrating an example of a function configuration of the radio base station according to this Embodiment.

FIG. 9 is a principal function configuration diagram of the baseband signal processing section 104 of the radio base station 10 according to this Embodiment. As shown in FIG. 9, the baseband signal processing section 104 of the radio base station 10 is configured to include at least a control section 301, a transmission signal generating section 302, a mapping section 303, and a received signal processing section 304.

The control section 301 controls scheduling of downlink user data transmitted on the PDSCH, and downlink control signal and a downlink reference signal transmitted on one or both of the PDCCH and the Enhanced PDCCH (EPDCCH). Further, the control section 301 controls (allocation control) scheduling of a RA preamble transmitted on the PRACH, uplink data transmitted on the PUSCH, and uplink control information and an uplink reference signal transmitted on the PUCCH or the PUSCH. The control section 301 notifies the user terminal 20 of information related to allocation control of an uplink signal (an uplink control signal and uplink user data) by using a downlink control signal (DCI).

The control section 301 controls allocation of radio resources for a downlink signal and an uplink signal based on instruction information from the higher station apparatus 30 and feedback information from each user terminal 20. That is, the control section 301 has a function of a scheduler. A controller, a control circuit or a control apparatus described based on the common knowledge in the technical field according to the present invention is applicable to the control section 301.

The transmission signal generating section 302 generates a downlink signal based on an instruction from the control section 301, and outputs the downlink signal to the mapping section 303. For example, the transmission signal generating section 302 generates a downlink assignment for notifying allocation information of a downlink signal, and uplink grant for notifying allocation information of an uplink signal based on the instruction from the control section 301. Further, the transmission signal generating section 302 performs coding processing and modulation processing on a downlink data signal according to a code rate and a modulating scheme determined based on channel state information (CSI) from each user terminal 20. A signal generator or a signal generation circuit described based on a common knowledge in the technical field according to the present invention is applicable to the transmission signal generating section 302.

The mapping section 303 maps the downlink signal generated by the transmission signal generating section 302, on predetermined radio resources based on the instruction from the control section 301, and outputs the downlink signal to the transmission/reception section 103. A mapper, a mapping circuit or a mapping apparatus described based on the common knowledge in the technical field according to the present invention is applicable to the mapping section 303.

The received signal processing section 304 performs reception processing (e.g. demapping, demodulation and decoding) on an UL signal (e.g. a transmission acknowledgement signal (HARQ-ACK), a data signal transmitted on a PUSCH or a random access preamble transmitted on a PRACH) transmitted from each user terminal. The received signal processing section 304 outputs a processing result to the control section 301. The received signal processing section 304 may measure received power (e.g. RSRP (Reference Signal Received Power)), received quality (RSRQ (Reference Signal Received Quality)) or a channel state by using the received signal. The received signal processing section 304 may output a measurement result to the control section 301. A signal processor, a signal processing circuit or a signal processing apparatus, and a measurement instrument, a measurement circuit or a measurement apparatus described based on the common knowledge in the technical field according to the present invention are applicable to the received signal processing section 304.

Figure 10:
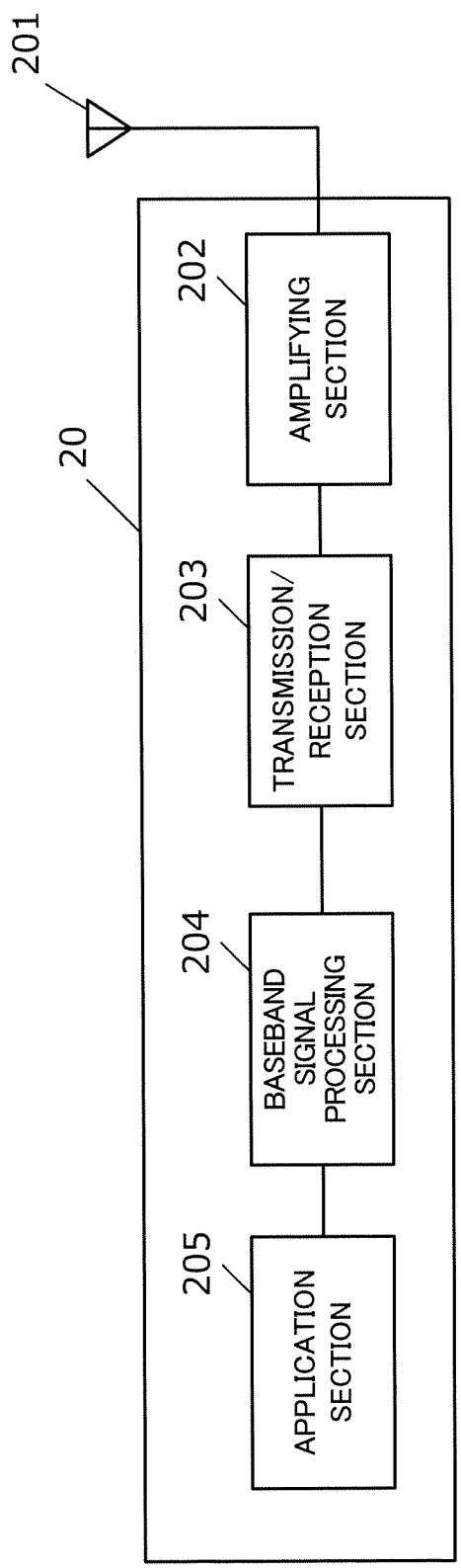
FIG. 10 is a diagram illustrating an entire configuration of a user terminal according to this Embodiment.

FIG. 10 is an entire configuration diagram of each user terminal 20 according to this Embodiment. As illustrated in FIG. 10, the user terminal 20 includes a plurality of transmission/reception antennas 201 for MIMO transmission, an amplifying section 202, a transmission/reception section (a transmission section and a reception section) 203, a baseband signal processing section 204, and an application section 205.

The amplifying section 202 amplifies a radio frequency signal received at each transmission/reception antenna 201, and the transmission/reception section 203 performs frequency conversion on the radio frequency signal into a baseband signal. The baseband signal processing section 204 performs FFT processing, error correcting decoding, reception processing of retransmission control and the like on the baseband signal. The baseband signal processing section 204 transfers downlink user data among the downlink data to the application section 205. The application section 205 performs processing concerning layers higher than a physical layer and a MAC layer. Further, the baseband signal processing section 204 transfers broadcast information among the downlink data, too, to the application section 205. A transmitter/receiver, a transmission/reception circuit or a transmission/reception apparatus described based on the common knowledge in the technical field according to the present invention is applicable to the transmission/reception section 203.

The transmission/reception section 203 receives scheduling information transmitted from the radio base station 10. The transmission/reception section 203 transmits a transmission acknowledgement signal by using the PUCCH format 3.

The application section 205 inputs uplink user data to the baseband signal processing section 204. The baseband signal processing section 204 performs transmission processing of retransmission control (HARQ), channel coding, precoding, discrete Fourier transform (DFT) processing, inverse fast Fourier transform (IFFT) processing and the like on the uplink user data to transfer to each of the transmission/reception sections 203. The transmission/reception section 203 converts the baseband signal output from the baseband signal processing section 204 into a signal of a radio frequency band. Subsequently, the amplifying section 202 amplifies the radio frequency signal subjected to the frequency conversion to transmit from the transmission/reception antenna 201.

Figure 11:
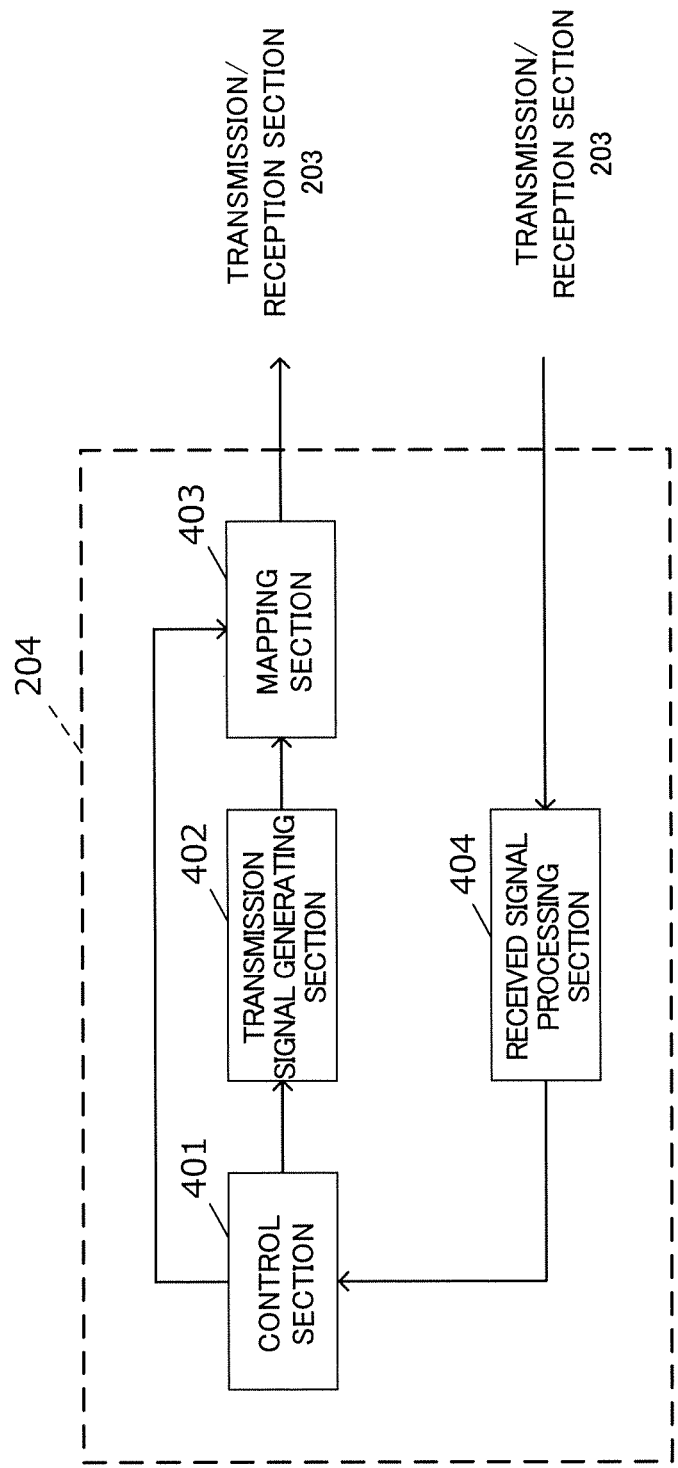
FIG. 11 is a diagram illustrating an example of a function configuration of the user terminal according to this Embodiment.

FIG. 11 is a principal function configuration diagram of the baseband signal processing section 204 of the user terminal 20. In addition, FIG. 11 mainly illustrates function blocks of characteristic portions in this Embodiment, and it is assumed that each user terminal 20 has other function blocks required for radio communication. As shown in FIG. 11, the baseband signal processing section 204 of each user terminal 20 is configured to include at least a control section 401, a transmission signal generating section 402, a mapping section 403, and a received signal processing section 404.

The control section 401 obtains downlink control signals (signals transmitted on the PDCCH/EPDCCH) and a downlink data signal (a signal transmitted on the PDSCH) transmitted from the radio base station 10 from the received signal processing section 404. The control section 401 controls generation of an uplink control signal (e.g. a transmission acknowledgement signal (HARQ-ACK)) and an uplink data signal based on a result obtained by determining whether or not it is necessary to perform retransmission control on the downlink control signal and the downlink data signal. More specifically, the control section 401 controls the transmission signal generating section 402 and the mapping section 403.

The control section 401 determines to apply spatial bundling of transmission acknowledge signals only to component carriers that the spatial bundling is applicable to, based on the received scheduling information. Alternatively, the control section 401 determines to apply the spatial bundling of transmission acknowledgement signals only to component carriers that the spatial bundling is applicable to when downlink shared channels (PDSCH) are allocated to 10 or more component carriers based on the received scheduling information.

The transmission signal generating section 402 generates an uplink signal based on an instruction from the control section 401, and outputs the uplink signal to the mapping section 403. For example, the transmission signal generating section 402 generates an uplink control signal such as a transmission acknowledgement signal (HARQ-ACK), a channel state information (CSI) and the like based on the instruction from the control section 401. The transmission signal generating section 402 generates an uplink data signal based on the instruction from the control section 401. When, for example, the downlink control signal notified from the radio base station 10 includes an uplink grant, the control section 401 instructs the transmission signal generating section 402 to generate an uplink data signal. A signal generator or a signal generation circuit described based on the common knowledge in the technical field according to the present invention is applicable to the transmission signal generating section 402.

The mapping section 403 maps the uplink signal generated by the transmission signal generating section 402, on radio resources based on the instruction from the control section 401, and outputs the uplink signal to the transmission/reception section 203. A mapper, a mapping circuit or a mapping apparatus described based on the common knowledge in the technical field according to the present invention is applicable to the mapping section 403.

The received signal processing section 404 performs reception processing (e.g. mapping, demodulation and decoding) on the downlink signal (a downlink control signal transmitted from the radio base station or a downlink data signal transmitted on the PDSCH). The received signal processing section 404 outputs information received from the radio base station to the control section 401. The received signal processing section 404 outputs, for example, broadcast information, system information, paging information, RRC signaling and a DCI to the control section 401.

The received signal processing section 404 may measure received power (RSRP), received quality (RSRQ) and a channel state by using the received signals. The received signal processing section 404 may output a measurement result to the control section 401.

A signal processor, a signal processing circuit or a signal processing apparatus, and a measurement instrument, a measurement circuit or a measurement apparatus described based on the common knowledge in the technical field according to the present invention are applicable to the received signal processing section 404.

The block diagrams used to describe the Embodiment illustrate blocks in function units. These function blocks (components) are realized by an arbitrary combination of hardware and software. Means for realizing each function block is not limited in particular. Each function block may be realized by one physically jointed apparatus or may be realized by a plurality of apparatuses formed by connecting two or more physically separated apparatuses by wires or by radio.

For example, part or all of the functions of the radio base station 10 and each user terminal 20 may be realized by using hardware such as an ASIC (Application Specific Integrated Circuit), a PLD (Programmable Logic Device) and a FPGA (Field Programmable Gate Array). The radio base station 10 and each user terminal 20 may be realized by a computer apparatus including a processor (CPU), a network connection communication interface, a memory, and a computer-readable storage medium that stores programs.

The processor and the memory are connected by a bus that communicates information. The computer-readable recording medium is, for example, a storage medium such as a flexible disk, a magnetooptical disk, a ROM, an EPROM, a CD-ROM, a RAM or a hard disk. The programs may be transmitted from a network via telecommunications lines. The radio base station 10 and each user terminal 20 may include an input apparatus such as an input key or an output apparatus such as a display.

Function configurations of the radio base station 10 and each user terminal 20 may be realized by the above-described hardware, may be realized by a software module executed by the processor or may be realized by a combination of both. The processor causes an operating system to operate and control the entire user terminal. The processor reads programs, a software module or data from the storage medium out to the memory, and executes various types of processing according to the program, the software module or the data. The programs need to be programs that cause the computer to execute respective operations described in the above Embodiment. For example, the control section 401 of each user terminal 20 may be realized by a control program stored in the memory and operated by the processor or other function blocks may be realized likewise, too.

In this regard, the present invention is not limited to the above Embodiment, and can be variously changed and carried out. The sizes and the shapes illustrated in the accompanying drawings in the Embodiment are not limited thereto, and can be optionally changed within a scope that exhibits the effect of the present invention. In addition, the present invention can be optionally changed and carried out without departing from the scope of the object of the present invention.

The present application is based on Japanese Patent Application No. 2015-072399 filed on Mar. 31, 2015, entire content of which is expressly incorporated by reference herein.

The invention claimed is:

1. A terminal comprising:
a processor that determines, based on higher layer signaling, whether or not spatial bundling is applicable to transmission acknowledgement signals for downlink data signals in a plurality of cells configured in the terminal; and
a transmitter that transmits transmission acknowledgement signal bits that are generated based on whether or not the spatial bundling is applicable by using an uplink control channel,
wherein when application of the spatial bundling in a specific cell among the plurality of cells is indicated by the higher layer signaling, the processor determines whether or not the spatial bundling is applicable in the specific cell, based on whether or not a downlink data signal is actually allocated in the specific cell.

2. The terminal according to claim 1, wherein the processor controls generation of the transmission acknowledgement signal bits based on a number of cells that are configured in the terminal by higher layer signaling.

3. The terminal according to claim 2, wherein the processor controls generation of the transmission acknowledgement signal bits based on a transmission mode of the downlink data signal.

4. The terminal according to claim 2, wherein the processor controls generation of the transmission acknowledgement signal bits based on a value of a downlink allocation index (DAI) transmitted via a downlink control channel.

5. The terminal according to claim 2, wherein at least one of frequency division duplex (FDD) and time division duplex (TDD) is applied to the plurality of cells.

6. The terminal according to claim 1, wherein the processor controls generation of the transmission acknowledgement signal bits based on a transmission mode of the downlink data signal.

7. The terminal according to claim 6, wherein the processor controls generation of the transmission acknowledgement signal bits based on a value of a downlink allocation index (DAI) transmitted via a downlink control channel.

8. The terminal according to claim 6, wherein at least one of frequency division duplex (FDD) and time division duplex (TDD) is applied to the plurality of cells.

9. The terminal according to claim 1, wherein the processor controls generation of the transmission acknowledgement signal bits based on a value of a downlink allocation index (DAI) transmitted via a downlink control channel.

10. The terminal according to claim 9, wherein at least one of frequency division duplex (FDD) and time division duplex (TDD) is applied to the plurality of cells.

11. The terminal according to claim 1, wherein at least one of frequency division duplex (FDD) and time division duplex (TDD) is applied to the plurality of cells.

12. The terminal according to claim 1, wherein a number of the plurality of cells is six or more.

13. A radio communication method for a terminal comprising:
determining, based on higher layer signaling, whether or not spatial bundling is applicable to transmission acknowledgement signals for downlink data signals in a plurality of cells configured in the terminal; and
transmitting transmission acknowledgement signal bits that are generated based on whether or not the spatial bundling is applicable by using an uplink control channel, wherein when application of the spatial bundling in a specific cell among the plurality of cells is indicated by the higher layer signaling, the terminal determines whether or not the spatial bundling is applicable in the specific cell, based on whether or not a downlink data signal is actually allocated in the specific cell.

14. A base station comprising:
a transmitter that transmits, to a terminal, higher layer signaling for determining whether or not spatial bundling is applicable to transmission acknowledgement signals for downlink data signals in a plurality of cells configured in the terminal; and
a receiver that receives transmission acknowledgement signal bits that are generated by the terminal based on whether or not the spatial bundling is applicable, the transmission acknowledgement signal bits being transmitted by using an uplink control channel, wherein whether or not the spatial bundling is applicable in a specific cell among the plurality of cells is determined by the terminal based on whether or not a downlink data signal is actually allocated in the specific cell, when application of the spatial bundling in the specific cell is indicated by the higher layer signaling.

15. A system comprising a terminal and a base station:
the terminal comprises:
a processor that determines, based on higher layer signaling, whether or not spatial bundling is applicable to transmission acknowledgement signals for downlink data signals in a plurality of cells configured in the terminal; and
a first transmitter that transmits transmission acknowledgement signal bits that are generated based on whether or not the spatial bundling is applicable by using an uplink control channel,
wherein when application of the spatial bundling in a specific cell among the plurality of cells is indicated by the higher layer signaling, the processor determines whether or not the spatial bundling is applicable in the specific cell, based on whether or not a downlink data signal is actually allocated in the specific cell, and
the base station comprises:
a second transmitter that transmits, to the terminal, the higher layer signaling; and
a receiver that receives the transmission acknowledgement signal bits.

* * * * *